US010679210B2

(12) United States Patent
Ardashev et al.

(10) Patent No.: US 10,679,210 B2
(45) Date of Patent: Jun. 9, 2020

(54) BLOCKCHAIN TRANSACTION COMMITMENT ORDERING

(71) Applicant: International Business Machines Corporation, Armonk, NY (US)

(72) Inventors: Ruslan Ardashev, Rocky Point, NY (US); Nitin Gaur, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 15/633,357

(22) Filed: Jun. 26, 2017

(65) Prior Publication Data

US 2018/0374086 A1    Dec. 27, 2018

(51) Int. Cl.
| | |
|---|---|
| *G06F 3/06* | (2006.01) |
| *G06F 11/20* | (2006.01) |
| *G06F 11/10* | (2006.01) |
| *G06F 16/27* | (2019.01) |
| *G06F 16/13* | (2019.01) |
| *G06F 12/0873* | (2016.01) |
| *G06F 16/172* | (2019.01) |
| *G06F 12/0868* | (2016.01) |
| *G06F 12/0866* | (2016.01) |
| *G06Q 20/38* | (2012.01) |
| *G06Q 20/40* | (2012.01) |
| *G06Q 40/00* | (2012.01) |
| *G06Q 20/06* | (2012.01) |
| *H04L 9/32* | (2006.01) |
| *G06F 8/71* | (2018.01) |

(Continued)

(52) U.S. Cl.
CPC ............. *G06Q 20/382* (2013.01); *G06F 8/71* (2013.01); *G06F 9/466* (2013.01); *G06F 16/219* (2019.01); *G06Q 20/06* (2013.01); *G06Q 20/401* (2013.01); *G06Q 40/12* (2013.12); *H04L 9/32* (2013.01); *H04L 9/3247* (2013.01)

(58) Field of Classification Search
CPC ...... G06Q 20/382; G06Q 40/12; G06Q 20/06; G06Q 20/401; G06F 16/219; G06F 8/71; G06F 9/3855; G06F 9/466; H04L 9/32; H04L 9/3247
See application file for complete search history.

(56) References Cited

U.S. PATENT DOCUMENTS

| | | | | |
|---|---|---|---|---|
| 4,956,772 A | * | 9/1990 | Neches | G06F 11/202 719/313 |
| 5,655,096 A | * | 8/1997 | Branigin | G06F 9/3836 712/200 |
| 6,061,449 A | | 5/2000 | Candelore et al. | |

(Continued)

OTHER PUBLICATIONS

Anonymously; Method for Analyzing Influence Among Data Items in Programs, ip.com, Apr. 16, 2015.

(Continued)

*Primary Examiner* — Charles Rones
*Assistant Examiner* — Tong B. Vo (57) ABSTRACT

A blockchain function may include one or more of identifying a plurality of new transactions to be committed to a blockchain, determining whether any of the plurality of new transactions comprises a data dependency with any other of the plurality of new transactions, and transmitting a plurality of messages providing validation of the plurality of the new transactions, responsive to the determining.

20 Claims, 6 Drawing Sheets

(51) Int. Cl.
*G06F 16/21* (2019.01)
*G06F 9/46* (2006.01)

(56) References Cited

U.S. PATENT DOCUMENTS

| | | | |
|---|---|---|---|
| 6,272,515 B1* | 8/2001 | Fouquet | G06F 9/466 |
| | | | 718/101 |
| 6,988,183 B1 | 1/2006 | Wong | |
| 9,875,510 B1* | 1/2018 | Kasper | G06Q 40/12 |
| 2016/0350749 A1 | 12/2016 | Wilkins et al. | |
| 2017/0109734 A1* | 4/2017 | Kote | G06Q 40/12 |
| 2018/0225611 A1* | 8/2018 | Daniel | G06Q 20/065 |
| 2018/0349898 A1* | 12/2018 | Ayikara Kizhakayil | |
| | | | G06F 21/34 |

OTHER PUBLICATIONS

Anonymously; System and Method for Identifying and Using Precise Change-Set Dependencies, ip.com, Apr. 23, 2013.

* cited by examiner

BLOCKCHAIN TRANSACTION COMMITMENT ORDERING

TECHNICAL FIELD

This application generally relates to transaction ordering, and more particularly, blockchain transaction commitment ordering.

BACKGROUND

A blockchain may be used as a public ledger to store any type of information. Although, primarily used for financial transactions, a blockchain can store any type of information, including assets (i.e., products, packages, services, status, etc.) in its immutable ledger. A decentralized scheme transfers authority and trusts to a decentralized network and enables its nodes to continuously and sequentially record their transactions on a public "block," creating a unique "chain" referred to as the blockchain. Cryptography, via hash codes, is used to secure an authentication of a transaction source and removes the need for a central intermediary.

The combination of cryptography and blockchain technology together ensures there is never a duplicate recording of the same transaction. Modern processors may execute instructions out of order (OoO), however this concept and what processors do are two distinct topics since processors must always maintain the architectural illusion of in-order execution, even though all that needs to be performed is the reduction of data dependences.

SUMMARY

One example embodiment may include one or more of identifying a plurality of new transactions to be committed to a blockchain, determining whether any of the plurality of new transactions comprises a data dependency with any other of the plurality of new transactions, and transmitting a plurality of messages providing validation of the plurality of the new transactions, responsive to the determining.

Another example embodiment may include an apparatus that includes a processor configured to perform one or more of identify a plurality of new transactions to be committed to a blockchain, determine whether any of the plurality of new transactions comprises a data dependency with any other of the plurality of new transactions, and a transmitter configured to transmit a plurality of messages indicating to proceed with validation of the plurality of the new transactions, responsive to the determining.

Still another example embodiment may include a non-transitory computer readable storage medium configured to store instructions that when executed cause a processor to perform one or more of identifying a plurality of new transactions to be committed to a blockchain, determining whether any of the plurality of new transactions comprises a data dependency with any other of the plurality of new transactions, and transmitting a plurality of messages indicating to proceed with validation of the plurality of the new transactions, responsive to the determining.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to management of blockchain transaction ordering, and in another embodiment relates to identifying pending transactions and determining relationships between the transactions to optimize transaction commitment ordering.

Example embodiments provide a new module for blockchain network architectures that will enable blockchain networks operate efficiently regardless of data dependences between pending transactions to optimize network speed, processing efficiency and other computing resources. According to one example, an ordering module may be part of a transaction server which receives transactions and buffers the transactions and pending instructions used to analyze data dependences between those transactions. If no data dependences are identified, then instructions proceed to simultaneously forward instructions for validation and commitment of the transactions may be performed out-of-order. This approach optimizes instruction processing times.

Figure 1:
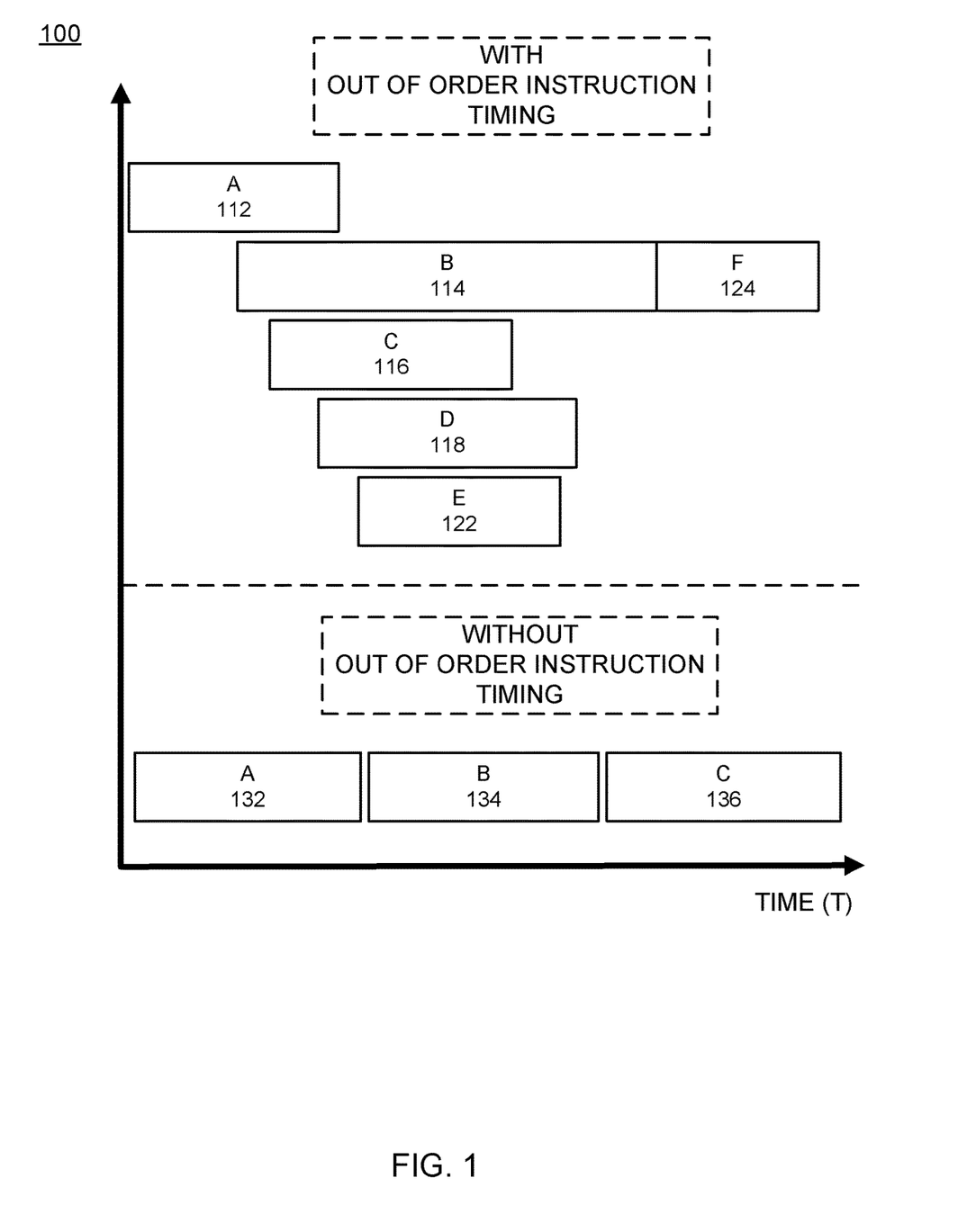
FIG. 1 illustrates a transaction processing configuration illustrating the differences between out of order instruction timing and non-out of order instruction timing for transactions in a blockchain according to example embodiments.

FIG. 1 illustrates a transaction processing configuration illustrating the differences between out of order instruction timing and non-out of order instruction timing for transactions in a blockchain according to example embodiments. Referring to FIG. 1, the configuration 100 includes examples of in-order (without out-of-order) and out-of-order transaction processing. Referring to the example with transactions 112-124 (A-F), the out-of-order instructions permit bypassing of the waiting for previous instructions to first commit a transaction before proceeding to process further instructions. In the diagram 100, the size of the instructions does not reflect the amount of instructions, as the size is merely an indicator to illustrate time spent on that particular transaction/instruction. The 'in-order' instructions are about the same size as they are all sequentially processed in a similar amount of time whereas the out-of-order instructions are overlapping and asynchronous and may vary in time spent to perform the processing. In the 'out-of-order' model, the instructions for F 124 need to wait for instructions from transaction B 114 to complete, since a pending order module used to process the transactions (see FIG. 1). Further, data dependences are analyzed, and if a data dependency exists between instructions for D 118 and F 124, a signal is used to wait for all previous instructions to commit. In this case, instructions for B 114 are the last instruction to wait before proceeding to commitment. In the in-order approach or without out-of-order instruction timing, the instructions for transactions A 132, B 134 and C 136 are processed in-order without any type of parallel processing, asynchronous processing and/or simultaneous processing of transactions for commitment. The various transactions may be identified according to their instructions that relate to data and make modifications. For example, Instructions for transactions A through E related to certain data but only D and F are detected to have data collisions by the pending order module.

Without OoO processing, the transactions are committed in the following order: A, B, C, D, E, F. Applying OoO transaction management support, the transactions are committed in the following order: A, C, E, D, B, F. Transactions using OoO may follow a procedure where a peer node publishes the beginning of a transaction to fellow peers as well as data surrounding which data is affected by that transaction. A transaction undergoes consensus by its peers and once approved, it is appended locally to the blockchain. Hash implementations or how the transactions are specifically linked out of order, with the "overall" results of a blockchain being the same, will vary by implementation.

Figure 2:
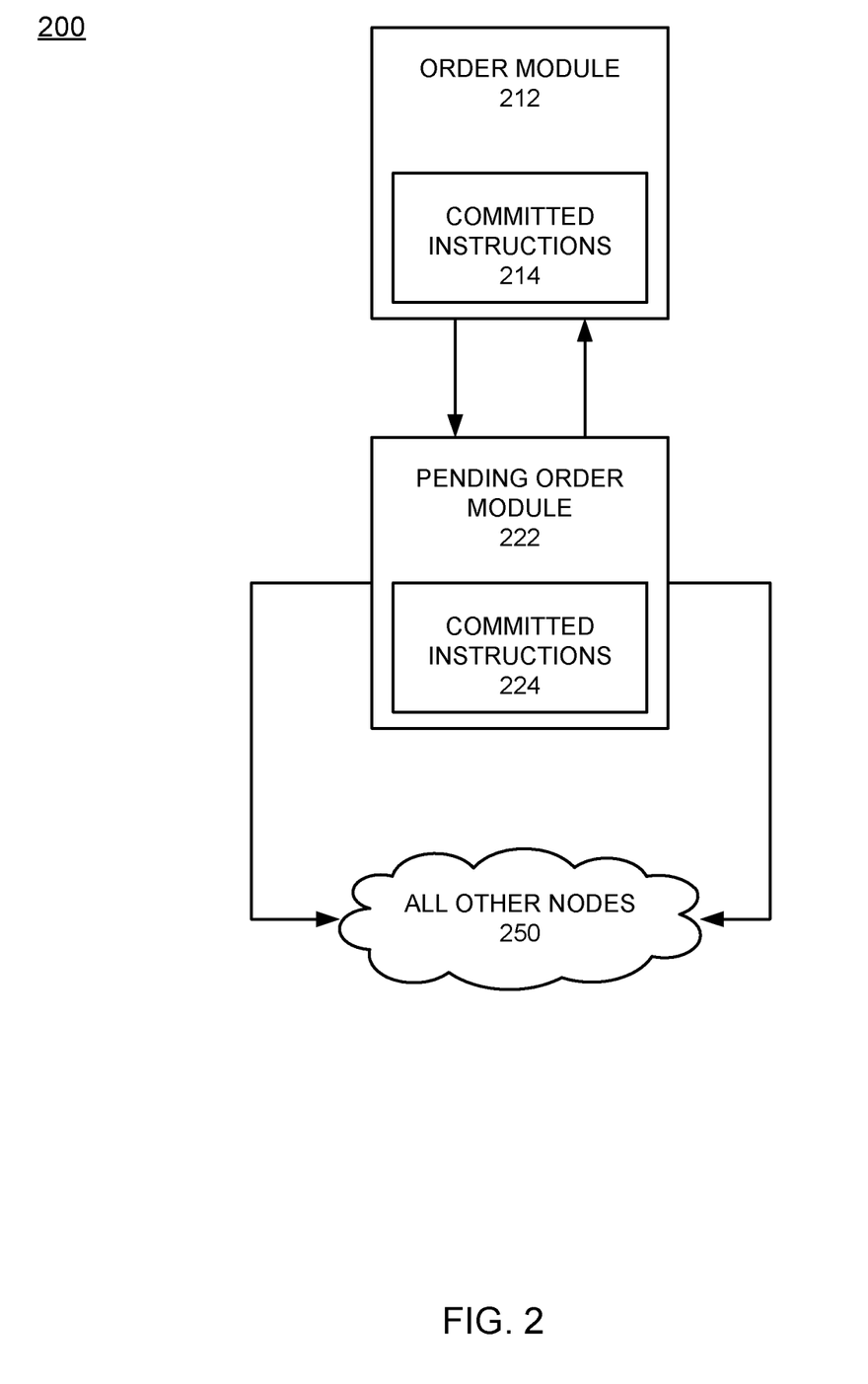
FIG. 2 illustrates a transaction ordering logic configuration according to example embodiments.

FIG. 2 illustrates a transaction ordering logic configuration according to example embodiments. Referring to FIG. 2, the example illustration 200 provides for an order module 212 which provides committed instructions for committing transactions 214 to a pending order module 222. The committed instructions 224 of the pending order module 222 may be different from the original transaction order module 212. All other nodes 250 are also able to communicate the instructions to the pending order module 222. The pending order module 222 tracks all pending instructions and their states (e.g., pending sending out for consensus, pending consensus, pending commitment to the blockchain). Pending sending is the most premature status, pending consensus is second, and pending commitment is what has reached consensus and is awaiting finalization.

The order module 212 tracks the state of all previously committed instructions which already exist. Instructions begin a lifecycle based on user input to perform some predefined action(s) (i.e., request shares, transfer car, purchase house, enter mortgage information, etc.). These commands are then converted to blockchain instructions via smart contracts and the instructions include read and/or write data locations with clearly defined data locations, which are then inputted into the pending order module 222. In the pending order module 222, data locations of instructions are analyzed for data dependencies. If instructions are cleared to proceed, they are sent out for consensus in order, returned out-of-order, and are committed to the blockchain in no particular order. If data dependences exist instructions are marked to wait for all prior instructions to commit first before the latter instructions.

There are two categories of data dependencies including, write-after-read and write-after-write. Write-after-read instructions end up reading old data since a newer instruction has been dispatched to other nodes but not yet returned through consensus mechanisms. As a result, the newer instruction falsely reads an old value, and after that older instruction is committed, the newer instruction may proceed. In the write-after-write dependency, two instructions are dispatched in a correct order, but the younger/newer instruction commits and writes first, followed by the older instruction. In this case, data irregularities will occur if both instructions write to the same data location. To deal with data dependences, younger instructions may be commanded to wait for the older instructions, with which they conflict, to commit first, which includes all the following instructions. As illustrated in FIG. 1, a data dependency exists between instructions B 114 and F 124, or, more specifically, instruction F 124 reads from the data location to which instruction B 114 writes. As a result, instruction F 124 is forced to wait for instruction B 114, and all following instructions, in order to commit.

In general, when data dependences exist, instructions are marked to wait for all prior instructions to commit prior to being committed. If conflicts exist between which data instructions are related to or interact with, such as in the example between D and F above, then F does not enter the "pending sending out for consensus" phase until D has been committed. This way we potential consensus issues are averted. When a transaction is submitted by a client to a peer node, the peer node enables the pending order module to scan for data dependences, and if no data dependences exist between any of the transactions that are currently pending consensus or commitment status, then the transaction is also sent out of consensus and commitment which can be committed out-of-order. If a new transaction does conflict with any of the "in processing" transactions/instructions (the terms are used interchangeably as the transactions includes discernable instructions), that transaction is then added to a queue to await all "in processing" instructions to complete. Once all "in processing" transactions are committed, the queued transactions are retrieved for commitment and the entire process will restart. One example of ordering may provide if A writes to location 1234 and B reads from location 1234, A must be 'waited for' in order to fully accept consensus and commitment before starting on B, since B will read from 1234, and consensus will be based on the results of what is read from 1234. This OoO consideration is one of many possibilities which may occur when there is more than one transaction pending for commitment.

Figure 3:
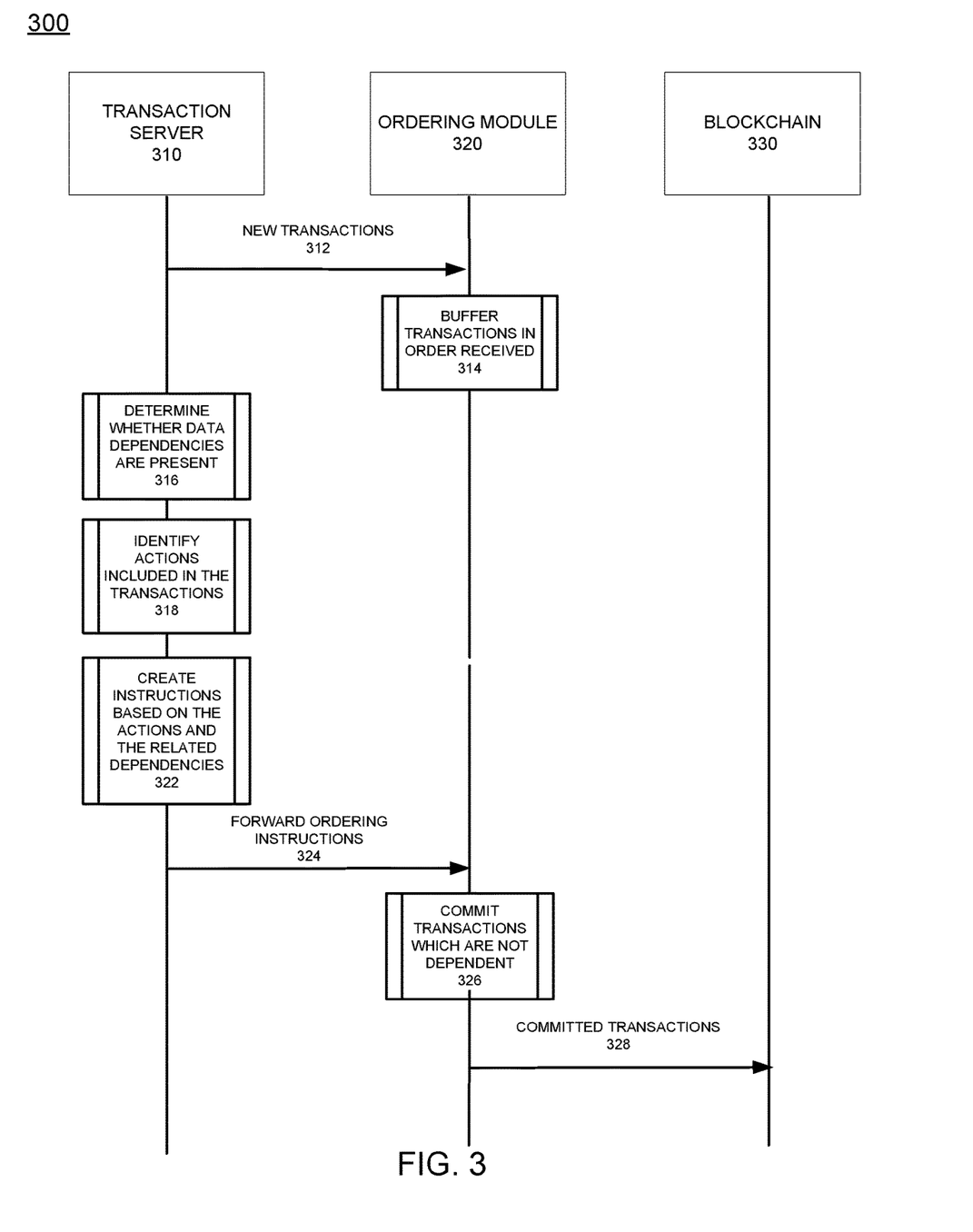
FIG. 3 illustrates a system signaling diagram of the interactions between a transaction ordering computing device, an ordering module, and a blockchain according to example embodiments.

FIG. 3 illustrates a system messaging diagram 300 of the interactions between a transaction ordering computing device, an ordering module, and a blockchain according to example embodiments. Referring to FIG. 3, the system 300 may include a number of components or modules which may include software, hardware or a combination of both. The components may include a first component, such as a transaction server 310, which may be a machine responsible for outputting transactions, instructions or other communication signals. A second component, such as an ordering module 320, may be one or both of the modules of FIG. 2 and may be part of the transaction server 310. The purpose of the ordering module 320 is to manage instructions for transaction management and commitment. In operation, new transactions 312 may be identified and queued for processing. The transactions may be buffered along with instructions for seeking consensus, ordering the transactions, identifying dependencies and committing the transactions to a third component such as a blockchain 330. The transactions are initially buffered based on an order they are received 314. The ordering and instructions may dictate various re-ordering procedures. The next operation is to identify data dependencies 316 between the transactions. Actions are identified from each of the transactions 318 and those actions which are dependent on one another are identified as having dependencies. The ordering or reordering instructions 324 are then created and forwarded 324 to the ordering module 320 so the transactions can be committed 326 and forwarded 328 to the blockchain 330.

In one embodiment, the first component, the second component and the third component may be separate devices such as servers, computers or other computational devices or may be a single device. In other embodiments, the first component and the second component may be enclosed as, or perform as, a single device, the first component and the third component may be enclosed as, or perform as, a single device, and the second component and the third component may be enclosed as, or perform as, a single device. The components or devices 310, 320 and 330 may be directly connected or communicably coupled to one another, in a wired or wireless manner, and may reside locally and/or remotely.

Figure 4A:
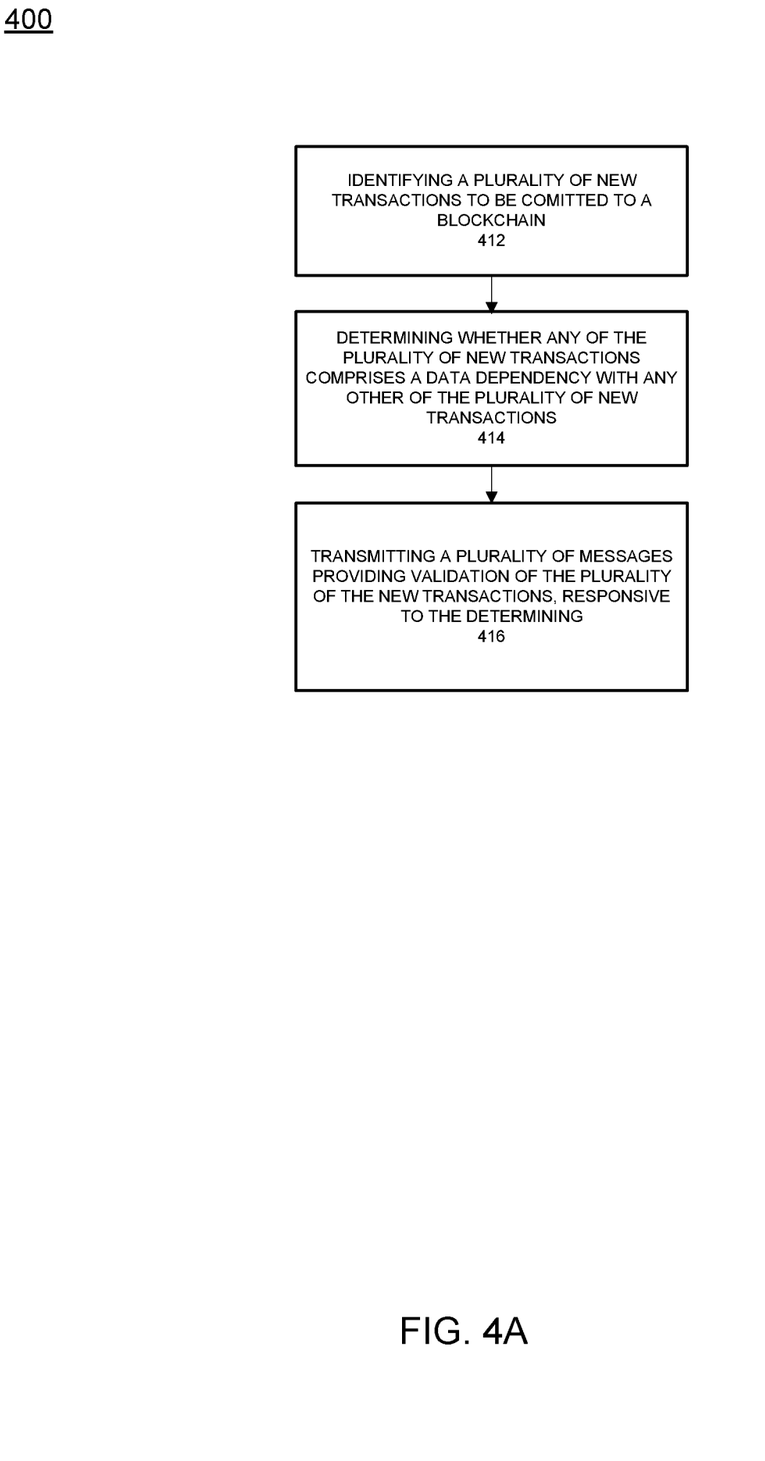
FIG. 4A illustrates a flow diagram of an example method of managing transaction ordering in the blockchain according to example embodiments.

FIG. 4A illustrates a flow diagram 400 of an example may include managing transaction ordering in the blockchain according to example embodiments. Referring to FIG. 4A, the example may include one or more of: identifying a plurality of new transactions to be committed to a blockchain 412, determining whether any of the plurality of new transactions includes a data dependency with any other of the plurality of new transactions 414, transmitting a plurality of messages indicating to proceed with validation of the plurality of the new transactions 416, responsive to determining that there are no data dependencies between any of the new transactions. The plurality of messages may be transmitted simultaneously. The method may include buffering the plurality of new transactions according to a chronological order in an ordering module including memory to store the plurality of new transactions, and committing one or more of the new transactions out of the chronological order with one or more other of the plurality of transactions, responsive to determining that there are no data dependencies between any of the new transactions. The method may also include identifying one or more actions identified from the plurality of blockchain transactions, and creating one or more instructions corresponding to the one or more actions. The method may further provide forwarding the one or more instructions to the ordering module, such that the one or more instructions includes read and write data locations, and committing the plurality of transactions based on the one or more instructions. The method may also include identifying one or more data dependencies among the plurality of transactions, and marking the one or more instructions to wait until a time when all previously created instructions are associated with committed transactions. The data dependencies include one or more of a same product identified in two or more transactions and a common party to a subsequent transaction.

Figure 4B:
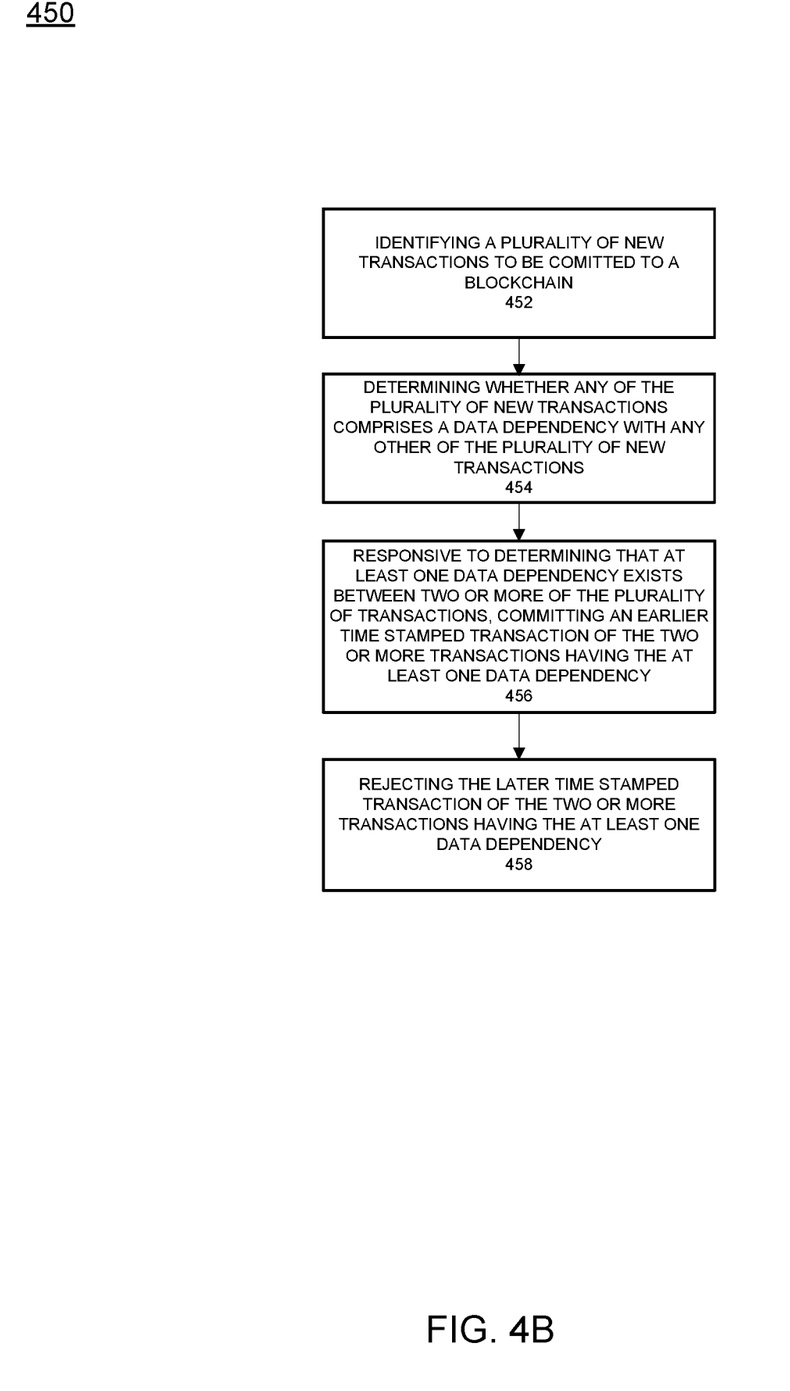
FIG. 4B illustrates another flow diagram of an example method of managing transaction ordering in the blockchain according to example embodiments.

FIG. 4B illustrates another flow diagram 450 of an example may include managing transaction ordering in the blockchain according to example embodiments. The example may include one or more of: identifying a plurality of new transactions to be committed to a blockchain 452, determining whether any of the plurality of new transactions comprises a data dependency with any other of the plurality of new transactions 454, responsive to determining that at least one data dependency exists between two or more of the plurality of transactions, committing an earlier time stamped transaction of the two or more transactions having the at least one data dependency 456, and rejecting the later time stamped transaction of the two or more transactions having the at least one data dependency 458.

In this example, the data dependencies are identified and the chronological order of the transactions are also identified. As a result, when two or more transactions have a data dependency and do not have a common time stamp (i.e. different creation times). The earlier queued or received transaction will be permitted to be committed and any other transactions sharing the same data dependency will be suspended or rejected pending evidence of additional resources which have become available to fulfill the transaction requirements.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent or be integrated in any of the above-described components, etc.

Figure 5:
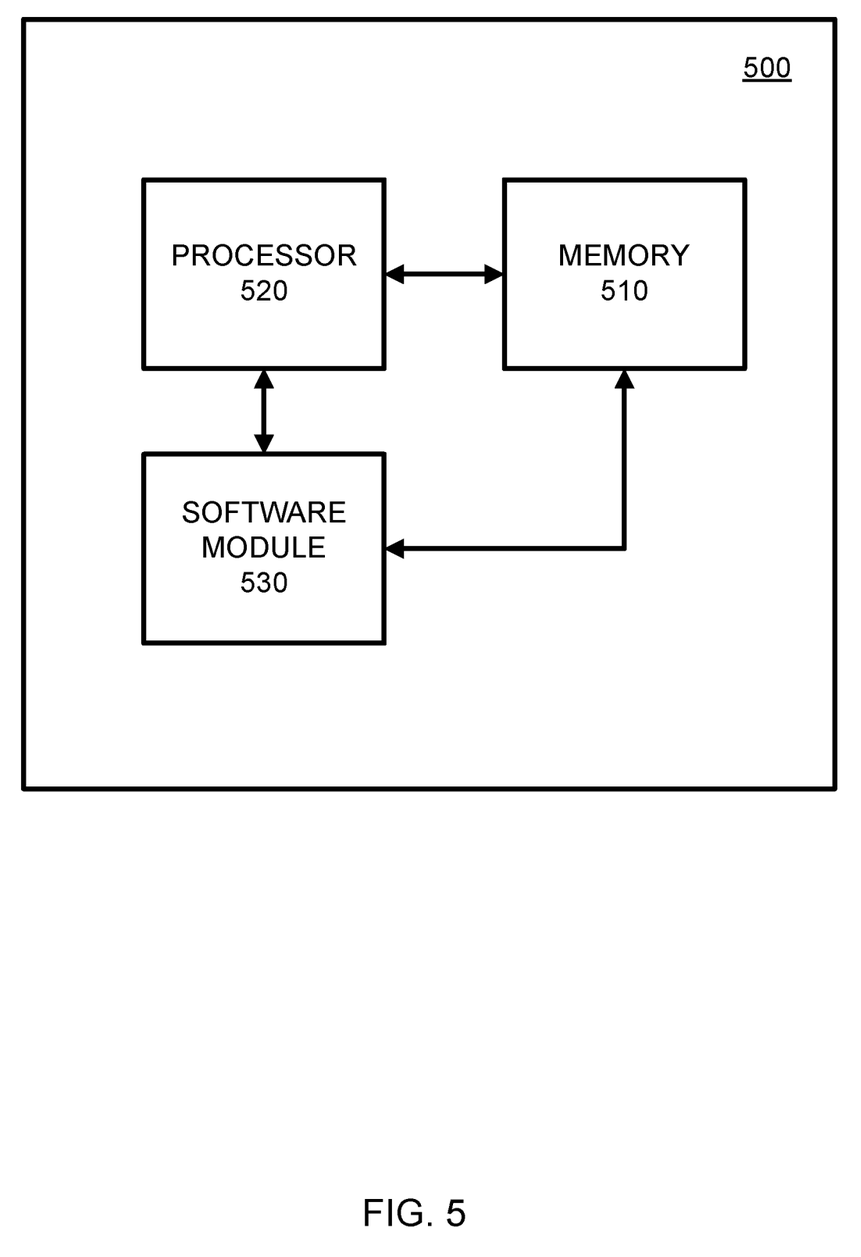
FIG. 5 illustrates an example network entity configured to support one or more of the example embodiments.

As illustrated in FIG. 5, a memory 510 and a processor 520 may be discrete components of a network entity 500 that are used to execute an application or set of operations as described and depicted herein. The application may be coded in software in a computer language understood by the processor 520, and stored in a computer readable medium, such as, a memory 510. The computer readable medium may be a non-transitory computer readable medium that includes tangible hardware components, such as memory, that can store software. Furthermore, a software module 530 may be another discrete entity that is part of the network entity 500, and which contains software instructions that may be executed by the processor 520 to effectuate one or more of the functions described herein. In addition to the above noted components of the network entity 500, the network entity 500 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that the "system" or one or more components or elements of the instant application could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, with steps that are combined, with steps that are omitted, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application, in one embodiment, should be defined by the appended claims when considered with a full range of equivalents and modifications (e.g., protocols, hardware devices, software platforms etc.) thereto.

What is claimed is:

1. A method, comprising:
   identifying a plurality of new transactions to be committed to a blockchain;
   determining whether any of the plurality of new transactions comprises a data dependency with any other of the plurality of new transactions;
   responsive to determining that there is at least one data dependency, committing an earlier time stamped transaction of two or more transactions having the at least one data dependency, and responsive to determining that there are no data dependencies between any of the new transactions, committing one or more of the new transactions out of a chronological order with one or more other of the plurality of new transactions; and
   rejecting a later time stamped transaction of the two or more transactions having the at least one data dependency, wherein the later time stamped transaction having a creation time later than that of one or more others of the two or more transactions including the earlier time stamped transaction.

2. The method of claim 1, further comprising:
   transmitting a plurality of messages providing validation of the plurality of the new transactions based on the determining that there are no data dependencies between any of the new transactions, wherein the plurality of messages are transmitted simultaneously.

3. The method of claim 1, further comprising:
   buffering the plurality of new transactions according to the chronological order in an ordering module comprising memory to store the plurality of new transactions; and committing one or more of the new transactions out of the chronological order with one or more other of the plurality of new transactions based on the determining that there are no data dependencies between any of the new transactions.

4. The method of claim 3, further comprising:
identifying one or more actions identified from the plurality of new transactions committed to the blockchain; and
creating one or more instructions corresponding to the one or more actions.

5. The method of claim 4, further comprising:
forwarding the one or more instructions to the ordering module, wherein the one or more instructions comprise read and write data locations; and
committing the plurality of new transactions based on the one or more instructions.

6. The method of claim 5, further comprising:
identifying one or more data dependencies among the plurality of new transactions; and
marking the one or more instructions to wait until a time when all previously created instructions are associated with committed transactions.

7. The method of claim 6, wherein the one or more data dependencies comprise one or more of a same product identified in two or more transactions and a common party to a subsequent transaction.

8. A non-transitory computer readable storage medium to store one or more instructions that when executed by a processor cause the processor to perform:
identifying a plurality of new transactions to be committed to a blockchain;
determining whether any of the plurality of new transactions comprises a data dependency with any other of the plurality of new transactions;
responsive to determining that there is at least one data dependency, committing an earlier time stamped transaction of two or more transactions having the at least one data dependency, and responsive to determining that there are no data dependencies between any of the new transactions, committing one or more of the new transactions out of a chronological order with one or more other of the plurality of new transactions; and
rejecting a later time stamped transaction of the two or more transactions having the at least one data dependency, wherein the later time stamped transaction having a creation time later than that of one or more others of the two or more transactions including the earlier time stamped transaction.

9. The non-transitory computer readable storage medium of claim 8, further to store one or more instructions that when executed by the processor cause the processor to perform:
transmitting a plurality of messages indicating to proceed with validation of the plurality of the new transactions based on the determining that there are no data dependencies between any of the new transactions, wherein the plurality of messages are transmitted simultaneously.

10. The non-transitory computer readable storage medium of claim 8, further to store one or more instructions that when executed by the processor cause the processor to perform:
buffering the plurality of new transactions according to the chronological order in an ordering module comprising memory to store the plurality of new transactions; and
committing one or more of the new transactions out of the chronological order with one or more other of the plurality of new transactions based on the determining that there are no data dependencies between any of the new transactions.

11. The non-transitory computer readable storage medium of claim 10, further to store one or more instructions that when executed by the processor cause the processor to perform:
identifying one or more actions identified from the plurality of new transactions committed to the blockchain; and
creating one or more instructions corresponding to the one or more actions.

12. The non-transitory computer readable storage medium of claim 11, further to store one or more instructions that when executed by the processor cause the processor to perform:
forwarding the one or more instructions to the ordering module, wherein the one or more instructions comprise read and write data locations; and
committing the plurality of new transactions based on the one or more.

13. The non-transitory computer readable storage medium of claim 12, further to store one or more instructions that when executed by the processor cause the processor to perform:
identifying one or more data dependencies among the plurality of new transactions; and
marking the one or more instructions to wait until a time when all previously created instructions are associated with committed transactions, wherein the one or more data dependencies comprise one or more of a same product identified in two or more transactions and a common party to a subsequent transaction.

14. An apparatus, comprising:
a processor configured to:
identify a plurality of new transactions to be committed to a blockchain,
determine whether any of the plurality of new transactions comprises a data dependency with any other of the plurality of new transactions,
responsive to a determination that there is at least one data dependency, commit an earlier time stamped transaction of two or more transactions having the at least one data dependency, and responsive to a determination that there are no data dependencies between any of the new transactions, commit one or more of the new transactions out of a chronological order with one or more other of the plurality of new transactions; and
reject a later time stamped transaction of the two or more transactions having the at least one data dependency, wherein the later time stamped transaction having a creation time later than that of one or more others of the two or more transactions including the earlier time stamped transaction.

15. The apparatus of claim 14, further comprising:
a transmitter configured to:
transmit a plurality of messages indicating to proceed with validation of the plurality of the new transactions based on the determination that there are no data dependencies between any of the new transactions, wherein the plurality of messages are transmitted simultaneously.

16. The apparatus of claim 14, wherein the processor is further configured to:

buffer the plurality of new transactions according to the chronological order in an ordering module comprising memory to store the plurality of new transactions; and commit one or more of the new transactions out of the chronological order with one or more other of the plurality of new transactions based on the determination that there are no data dependencies between any of the new transactions.

17. The apparatus of claim 16, wherein the processor is further configured to:
   identify one or more actions identified from the plurality of new transactions committed to the blockchain; and
   create one or more instructions corresponding to the one or more actions.

18. The apparatus of claim 17, wherein the processor is further configured to:
   forward the one or more instructions to the ordering module, wherein the one or more instructions comprise read and write data locations; and
   commit the plurality of new transactions based on the one or more instructions.

19. The apparatus of claim 18, wherein the processor is further configured to:
   identify one or more data dependencies among the plurality of new transactions; and
   mark the one or more instructions to wait until a time when all previously created instructions are associated with committed transactions.

20. The apparatus of claim 19, wherein the one or more data dependencies comprise one or more of a same product identified in two or more transactions and a common party to a subsequent transaction.

* * * * *